(12) United States Patent
Blair et al.

(10) Patent No.: US 7,110,764 B1
(45) Date of Patent: Sep. 19, 2006

(54) MOBILITY MANAGER IN A WIRELESS IP CORE NETWORK

(75) Inventors: Dana Blair, Alpharetta, GA (US); Roy Hanzel, Allen, TX (US); Michael Shannon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 468 days.

(21) Appl. No.: 09/748,759

(22) Filed: Dec. 21, 2000

(51) Int. Cl.
*H04Q 7/20* (2006.01)

(52) U.S. Cl. .................. 455/436; 455/432.1; 455/433; 455/435.1

(58) Field of Classification Search ............. 455/432.1, 455/433, 435.1, 436, 437, 438, 439
See application file for complete search history.

(56) References Cited

U.S. PATENT DOCUMENTS

| | | | |
|---|---|---|---|
| 6,418,197 B1 * | 7/2002 | Tuunanen et al. | 379/67.1 |
| 6,622,016 B1 * | 9/2003 | Sladek et al. | 455/414 |
| 6,628,632 B1 * | 9/2003 | Dolan | 370/332 |
| 6,628,943 B1 * | 9/2003 | Agrawal et al. | 455/432.1 |
| 6,633,761 B1 * | 10/2003 | Singhal et al. | 455/436 |

OTHER PUBLICATIONS

Handley, et al., RFC 2543 "SIP: Session Initiation Protocol," IETF, Mar. 1999.
Arango et al., RFC 2705 "Media Gateway Control Protocol (MGCP)," IETF, Oct. 1999.
Yeong, et al., RFC 1777 "LDAP," IETF, Mar. 1995.
Ong, et al., RFC 2719 "Framework Architecture for Signaling Transport," IETF, Oct. 1999.
Rappaport, Theodore S., *Wireless Communications*, Upper Saddle River, NJ 1996, Ch. 9, pp. 14-20.

* cited by examiner

*Primary Examiner*—Temica Beamer
(74) *Attorney, Agent, or Firm*—Cindy Kaplan

(57) ABSTRACT

The functions performed by a mobile switching center (MSC) may be divided between two entities. A mobile control function performs mobility management functions such as roaming control, implementing hand-off, and coordinating bearer traffic flow. A call agent performs call control functions such as call setup, call tear down, and advanced call features such as call hold, call waiting, etc. The call agent is preferably unaware of mobile specific interfaces and can support multiple access network types including cable, DSL, PSTN, etc. This provides feature transparency for users as they use devices in each of the access domains.

40 Claims, 6 Drawing Sheets

MOBILITY MANAGER IN A WIRELESS IP CORE NETWORK

BACKGROUND OF THE INVENTION

The present invention is related to mobile wireless communication systems and more particularly to core networks for such mobile wireless systems.

Wireless communication systems typically include both a radio access network that provides connectivity to mobile stations and a backbone or core network that interconnects radio access points and provides connectivity to wireline networks such as the public switched telephone network (PSTN). In so-called second-generation systems, the radio access network portion is based on a digital mobile wireless communication standard such as GSM, IS-95, TDMA, etc. These standards are primarily oriented towards voice communication. The geographic area to be covered is divided into a number of cells, each cell being equipped with one or more base stations.

A mobile switching center (MSC) connects the public switched telephone network to a radio access network (RAN) linked to the base stations. One of the tasks of the MSC is to manage the wireless connection. This includes handling hand-offs, both between RANs or cells controlled by an MSC and to and from RANS or cells controlled by other MSCs, handling roaming, and providing a connection to and from the PSTN. The MSC is also responsible for handling call management including the signaling and call control functions to set up and tear down mobile originated calls, set up and tear down mobile terminated calls, and handled advanced calling features such as call waiting, call forwarding, etc.

Mobile wireless communications systems are now in the process of transitioning to a third generation. In a third generation wireless system, the radio access network is typically based on UMTS (the Universal Mobile Telecommunications System defined by ETSI) or the CDMA2000 standard (defined by TIA/EIA) and has been optimized to handle both voice and data. The core network is often based on IP and can provide connectivity to both the PSTN and the Internet. Simultaneously, voice telephony is undergoing its own transition from a circuit switched architecture where connection control systems, call control systems, and other services interact via proprietary interfaces in TDM switches to an open packet telephony model where services, call control, and connection control are handled by different entities that interact via interfaces specified by open standards.

There is a need for an architecture that performs the functions of the MSC of prior wireless communication systems while taking advantage of the flexibility provided by IP based core networks and packet based telephony.

SUMMARY OF THE INVENTION

According to the present invention, the functions performed by a mobile switching center (MSC) may be divided between two entities. A mobile control function performs mobility management functions such as roaming control, implementing hand-off, mobile authentication, and other mobile specific functions. A call agent performs call control functions such as call setup, call tear down, and advanced call features such as call hold, call waiting, etc. The call agent is preferably unaware of mobile specific interfaces and can support multiple access network types including cable, DSL, PSTN, etc. This provides feature transparency for users as they use devices in each of the access domains.

A first aspect of the present invention provides a method of operating a mobile control function in a data communication network for supporting mobile users. The method includes exchanging information with the mobile station via a radio access network according to a radio access network protocol, exchanging call control information with a call agent associated with a call of the mobile station, and maintaining connection state information for the mobile station while the mobile station is handled via the radio access network.

A second aspect of the present invention provides a method of operating a call agent in a data communication network for supporting mobile users. The method includes exchanging call control information with a first mobile control function responsible for mobility management of a mobile station having a call handled by the call agent, and maintaining calls state information for the mobile station.

In one embodiment, IP is the transport protocol defined for the 3G network and the inter-action of the call agent and mobile control function is defined by using the SIP signaling protocol as known in the art and control of the bearer path is defined by MGCP as known in the art.

A further understanding of the nature and advantages of the inventions herein may be realized by reference to the remaining portions of the specification and the attached drawings.

DESCRIPTION OF SPECIFIC EMBODIMENTS

Generally, the data networking techniques of the present invention may be implemented in software and/or hardware. For example, they can be implemented in an operating system kernel, in separate user processes, in a library package bound into a network application, on a specially constructed machine, or on a network interface card. In specific embodiments of this invention, these techniques may be implemented in software such as an operating system or in an application running on an operating system.

A software or software/hardware hybrid data networking system of this invention is preferably implemented on a general-purpose programmable machine selectively activated or reconfigured by a computer program stored in memory. Such a programmable machine may be a network device designed to handle network traffic. Such network devices typically have multiple network interfaces including frame relay and ISDN interfaces, for example. Specific examples of such network devices include routers and switches. For example, the data networking systems of this invention may operate on specially configured routers such as those available from Cisco Systems, Inc. of San Jose, Calif. A general architecture for some of these machines will appear from the description given below. In an alternative embodiment, the packet processing system may be implemented on a general-purpose network host machine such as a personal computer or workstation adapted to interface with computer networks.

Figure 1:
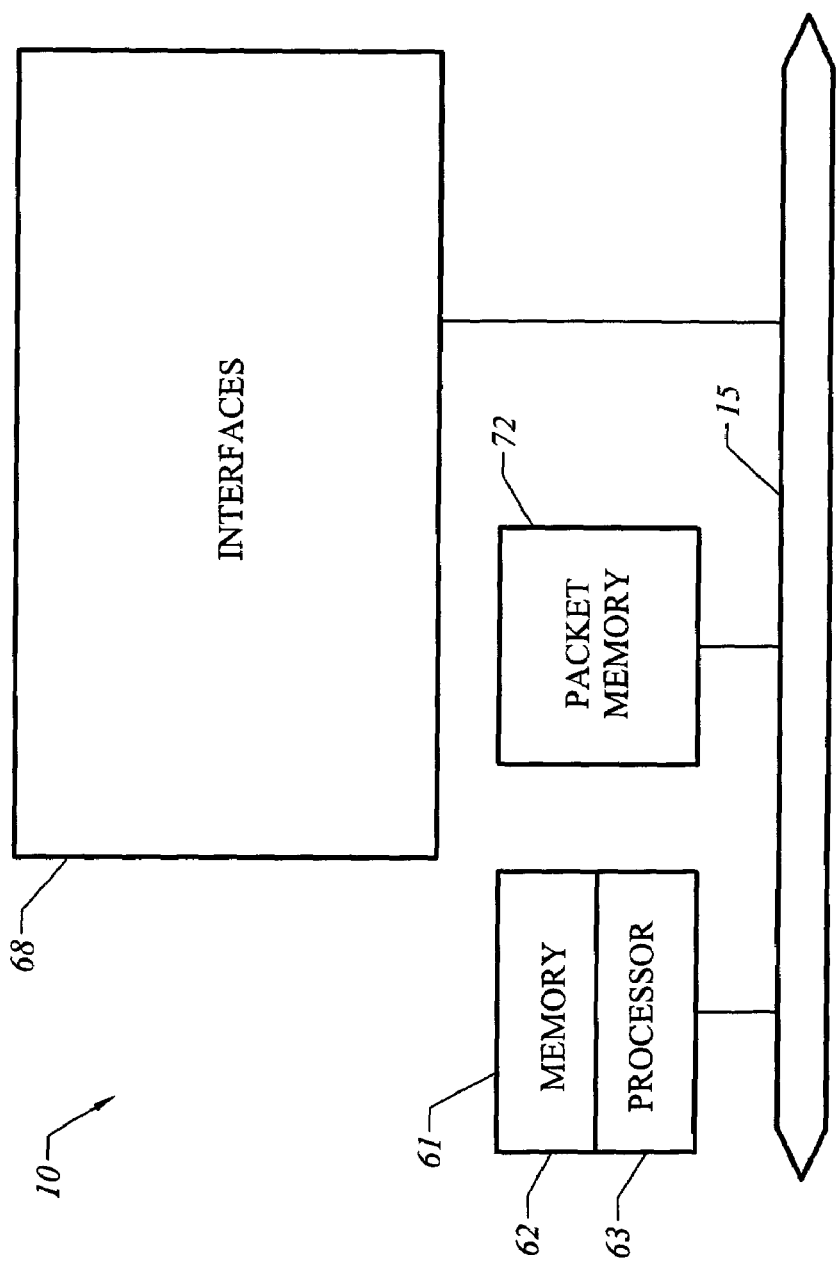
FIG. 1 depicts a network device suitable for implementing one embodiment of the present invention.

Referring now to FIG. 1, a network device suitable for implementing the present invention includes a master central processing unit (CPU) 61, interfaces 68, and a bus 15 (e.g., a PCI bus). As shown, CPU 61 includes a memory 62 and a processor 63. When acting under the control of appropriate software or firmware, CPU 61 is responsible for such router tasks as routing table computations, network management, and general processing of packets. It preferably accomplishes all these functions under the control of software including an operating system (e.g., a version of the Internetwork Operating Systems (IOS®) of Cisco Systems, Inc.) and any appropriate applications software. CPU 61 may include one or more processors 63 such as a processor from the Motorola family or MIPS family of microprocessors. In an alternative embodiment, processor 63 is specially designed hardware for controlling the operations of network device 10. Memory 62 can be non-volatile RAM and/or ROM. However, there are many different ways in which memory could be coupled to the system.

The interfaces 68 are typically provided as interface cards (sometimes referred to as "line cards"). Generally, they control the sending and receiving of data packets over the network and sometimes support other peripherals used with the router 10. Among the interfaces that may be provided are Ethernet interfaces, frame relay interfaces, cable interfaces, DSL interfaces, token ring interfaces, and the like. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processor may control such communications intensive tasks as packet switching, media control, and management. By providing separate processors for the communications intensive tasks, these interfaces allow the master microprocessor 61 to efficiently perform routing computations, network diagnostics, security functions, etc. Network device 10 may further include a packet memory 72 for intermediate storage of packets being forwarded by router 10.

Although the system shown in FIG. 1 is one network device of the present invention, it is by no means the only architecture on which the present invention can be implemented. For example, an architecture having a single processor that handles communications as well as connection control or call control is often used. Further, other types of interfaces and media could also be used with the router.

Regardless of a network device's configuration, it may employ one or more memories or memory modules (including memory 62) configured to store program instructions for the general-purpose network operations and packet processing and management functions described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Figure 2:
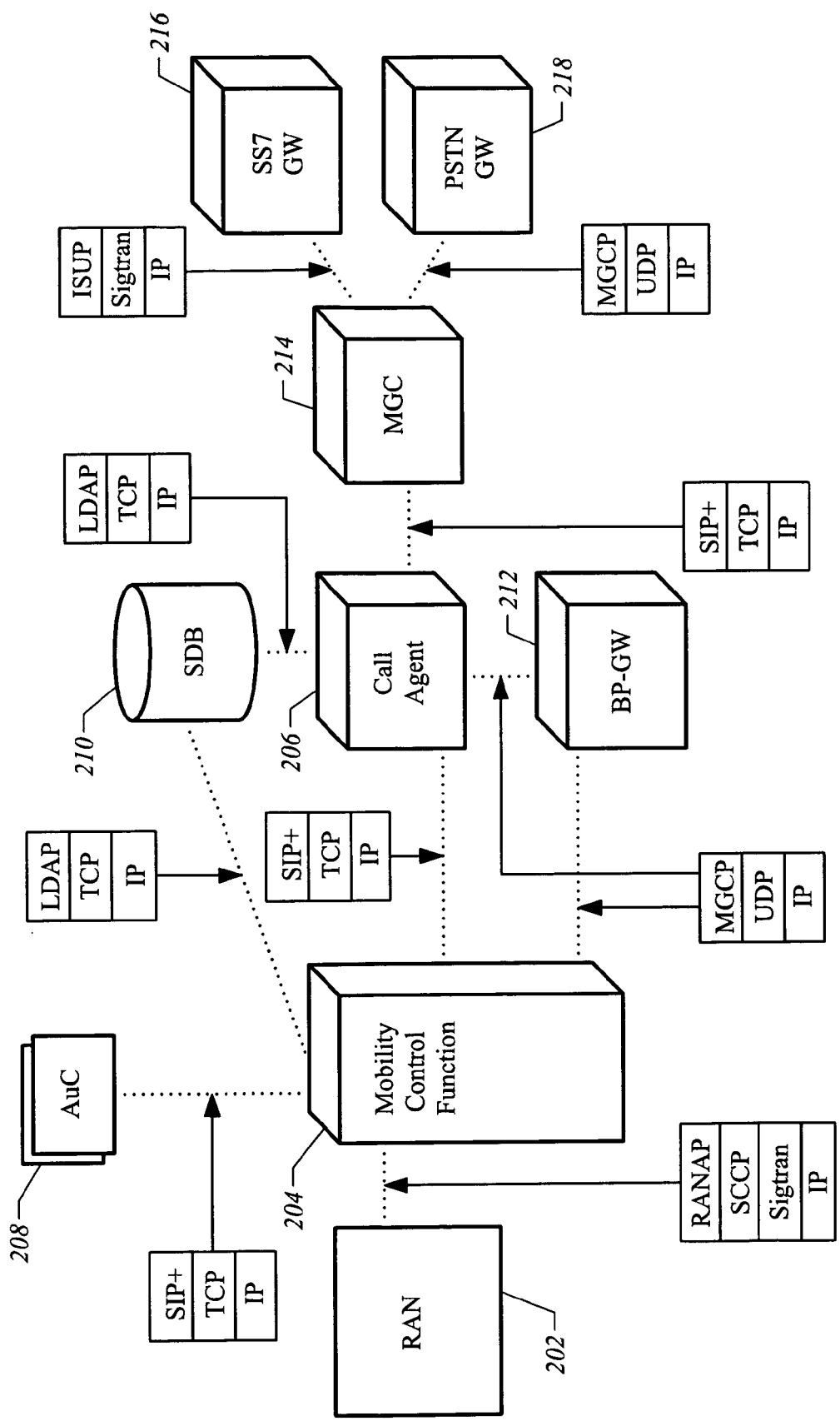
FIG. 2 depicts a mobile call architecture wherein mobile control functionality and call control functionality are separated according to one embodiment of the present invention.

FIG. 2 depicts a mobile call architecture wherein mobile control functionality and call control functionality are separated according to one embodiment to the present invention. The depicted elements include a radio access network (RAN) 202, a mobile control function (MCF) 204, a call agent (CA) 206, an authorization controller (AuC) 208, a subscriber database (SDB) 210, a bearer path gateway (BP GW) 212, a media gateway controller 214, an SS7 gateway (SS7 GW) 216, and a PSTN gateway (PSTN GW). The implementation of each the systems of FIG. 2 typically incorporates one or more devices such as in FIG. 1. The following description pertains most directly to a UMTS network but the present invention is also applicable to other mobile network standards such as cdma2000.

RAN 202 is preferably a third generation UMTS or cdma2000 network but also may be a GSM, IS-95, or other second generation wireless network, or any other kind of wireless network. RAN 202 includes multiple base stations to provide wireless access to mobile subscribers as well as one or more network devices to interconnect the base stations and connect to MCF 204 for signaling control. Multiple RANs 202 may be connected to a single MCF 204 but only one is depicted for ease of illustration.

MCF 204 performs mobility-related operations. These operations include handling roaming, cell to cell hand-off within RAN 202 or to a RAN managed by another MCF 204, location services for determining the location of a mobile subscriber, etc. MCF 204 maintains connection state information for mobile subscribers in RAN 202. The connection state information includes whether the mobile subscriber is currently registered ("mobile registered") and can be located and whether there is an active session ("session active").

The CA 206 is responsible for performing call control operations. The call control operations include, e.g. setting up and tearing down calls including both calls originated by the mobile station and calls terminated by the mobile station as well as more advanced calling features such as call waiting, call hold, etc. CA 206 preferably does not include any mobility specific features. CA 206 maintains call state information, i.e., the status of a call. For example a call may be in one of the states denoted by "connected," "call in progress," "releasing," "suspend," "busy," etc. The CA knows the progress of the call while the MCF only knows the mobile is active and/or has a session active. CA 206 may also handle non-mobile calls that are accessed via a data over cable network via cell network, PSTN, etc or may be identical in design to a CA that handles such non-mobile calls.

Together MCF 204 and CA 206 performs the functions implemented by an MSC in previous cellular networks. This distributed architecture has many advantages. For example, CA 206 need not be developed specifically for mobile applications. As new calling features are developed, they become available on all types of networks including mobile networks without the need to separately redesign the MSC. Also, a CA 206 may be combined with a MCF 204 made by a different vendor.

This is because the interface protocols between these two entities are preferably open and standard. Preferably, an extended version of SIP is used as the IP control protocol between MCF and CA. Also, it envisioned that as third generation networks advance, the volume of data to be handled will grow far more rapidly then the number of calls. This can be accommodated by expanding the capacity of MCF 204 while augmenting CA 206 only to the extent needed.

AuC 208 is invoked to authenticate mobile stations. An SDB 210 is a database of subscriber information. The SDB is shared by both CA 206 and MCF 204. Both have access to the same user profile information.

BP GW 212 is the gateway used for bearer traffic between RAN 202 and one or more of, for example, a PSTN, a private IP backbone the Internet, etc. BP GW 212 is controlled by both CA 206 and MCF 204 using the MGCP protocol. MCF 204 controls the bearer path from RAN 202 to BP GW 212 and CA 206 controls the bearer path from BP GW 212 to either the PSTN GW 218 or to the Internet.

MGC 214 is the controller for SS7 signaling. MGC 214 processes ISUP (ISDN User Part) messages received from SS7 GW 216 and PSTN GW 218 to set the bearer path for PSTN calls. In the depicted IP core architecture, MGC 214 acts as the PSTN network signaling interface—it interacts with CA 206 using SIP to set up calls to and from the PSTN.

SS7 gateway 216 provides a call control signal interface to an SS7 switch.

For each interconnection between the depicted elements, a protocol stack is depicted. It can be seen that IP is the preferred underlying protocol for communication within the core network architecture. Sigtran is used for the interaction between RAN 202 and MCF 204, for the interaction between MCF 204 and AuC 208, and the interaction between MGC 214 and SS7 gateway 216. Sigtran is defined by RFC 2719 published by the IETF in October 1999. Between RAN 202 and MCF 204, the higher level SCCP (Signaling Connection Control Part) and RANAP protocols are used. The RANAP protocol is a standardized interface for third generation networks as known in the art and is defined by UMTS/ETSI document 25.413 promulgated by ETSI. SCCP is defined by the Q.715 standard defined by the ITU and the Bellcore GR246 document.

Between MCF 204 and BW GW 212, the well known UDP protocol is used in conjunction with MGCP (Media Gateway Control Protocol). MGCP is a standardized protocol for communication between the call control plane and the connection plane in an open packet telephony system. MGCP is defined by RFC 2705 published by the IETF in October 1999. Between MCF 204 and SDB 210, the well-known TCP protocol is used in conjunction with the LDAP (Lightweight Directory Access Protocol) defined by RFC 1777 published by the IETF in March 1995. MGCP is also used between MGC 214 and PSTN GW 218.

The interface between MCF 204 and CA 206 is via SIP+, an extension to the session interface protocol defined by RFC 2543 published by the IETF in March 1999. MCFs and CAs in different networks also use SIP+ (an extended version of the SIP protocol) to interact with one another. SIP+ is also used to handle communication between MCF 204 and AuC 208 and between CA 206 and MGC 214. The interface between MGC 214 and SS7 GW 216 exploits Sigtran and ISUP (ISDN User Part).

The network of FIG. 2 will typically repeat itself for each MCF in the mobile wireless communication system. Each MCF will be connected to one or more RANs. Each RAN typically includes multiple cells. Each mobile subscriber will have a home network with a home MCF 204 and a home CA 206. The network that actually serves the mobile subscriber at any time is referred to as the serving network. Thus, if the mobile subscriber is within the geographic area covered by the RANs connected to the home MCF then the home network is the serving network. If the mobile subscriber roams however, then another network becomes the serving network. The MCF of the serving network is referred to as the serving MCF and the CA of the serving network is referred to as the serving CA. In the case of a hand-off between RANs, the network giving up the mobile subscriber is the source network and the network gaining access to the mobile subscriber is the target network.

Figure 3:
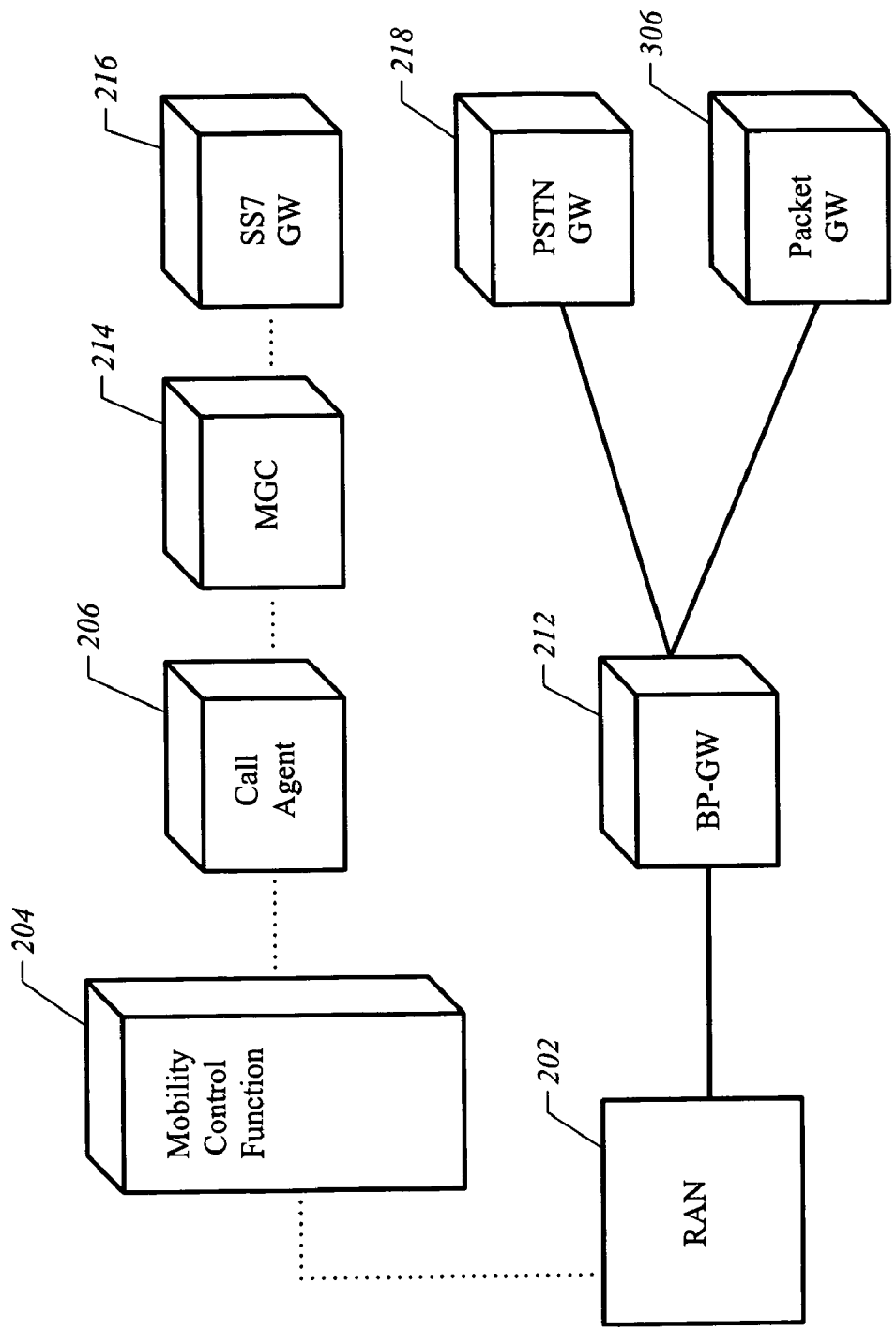
FIG. 3 depicts call signaling and bearer paths according to one embodiment of the present invention.

FIG. 3 is an alternate representation of the core network architecture that shows the division between the paths taken by call signaling and the path taken by bearer traffic including voice and data. In FIG. 3, the dotted line indicates the signaling path while the solid lines indicate the bearer path. As can be seen, the signaling path flows from RAN 202 to SS7 GW 216 and traverses MCF 204, CA 206, and MGC 214. The bearer path flows from RAN 202 through BW GW 212 and then continues on to either PSTN GW 218 or a packet gateway 306.

Figure 4:
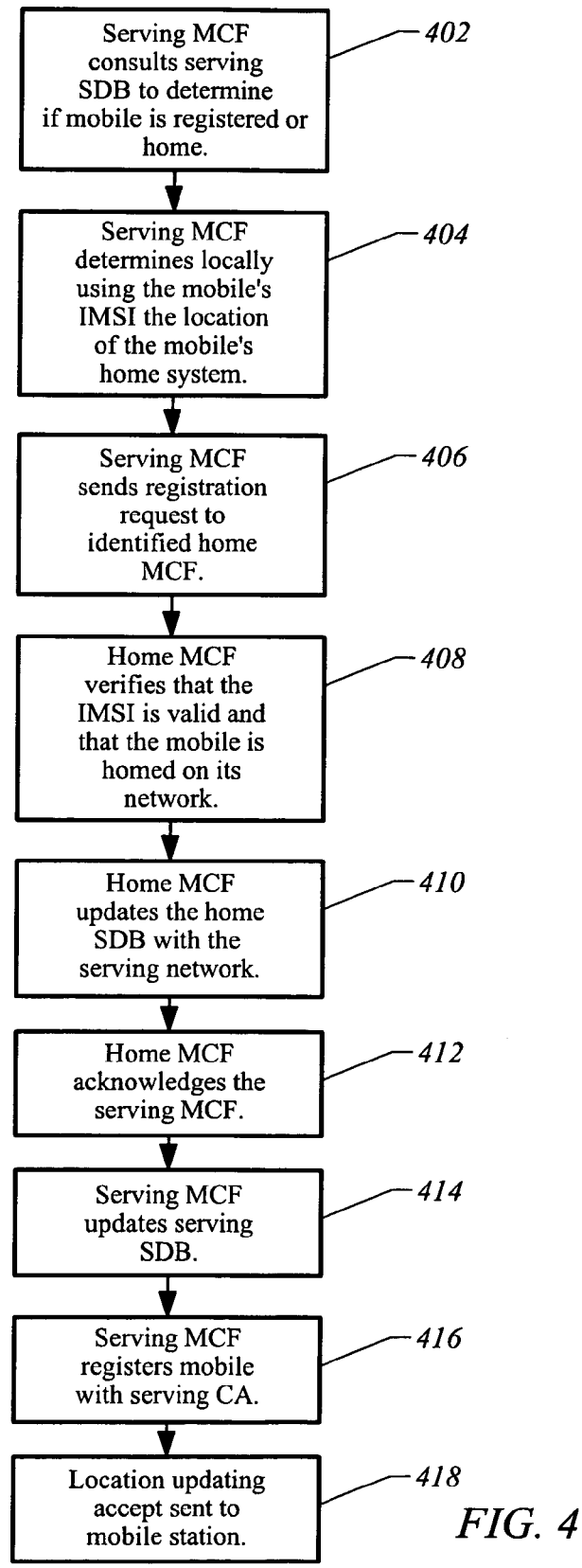
FIG. 4 is a flowchart describing steps of registering a roaming mobile unit according to one embodiment of the present invention.

FIG. 4 is a flowchart describing steps of registering a roaming mobile unit according to one embodiment of the present invention. It is assumed that the mobile station is located in the coverage area of a network other than its home network. FIG. 4 depicts how this mobile specific function can be accomplished within the architecture of FIG. 2 using the MCF only and without invoking the CA.

At the beginning of the registration process depicted in FIG. 4, the mobile station is accessing the serving network for the first time or its earliest registration has expired and hence the serving network has no database entry of the mobile station. After the procedure of FIG. 4 is complete, the mobile station is registered at the serving network. The serving network database is populated with information on the mobile station's home network MCF and home network CA. The home network database is populated with information on the serving network's MCF and CA.

At the beginning, the serving MCF 204 receives a registration request from a mobile station via the serving RAN 202. At step 402, the serving MCF 204 consults the serving SDB 210 to determine if the mobile station is registered in the serving network so that the serving network is its home network. Since this mobile station is a roamer from another network, and has not previously been registered (or its registration has expired), the mobile registration is not found within the serving SDB 210.

At step 404, serving MCF 204 determines using internal tables and the mobile station's IMSI (International Mobile Subscriber Identity) the location of the mobile's home network. Once MCF 204 has identified the home network for the mobile station, then MCF 204 sends a registration request to the home MCF of the mobile station at step 406. Once this registration request is fulfilled, the home MCF 204 authenticates the mobile station to the home AuC 208 at step 408. The authentication process here verifies that the IMSI is valid and that the mobile is in fact homed at this network.

Then at step 410, the home MCF 204 updates the home SDB 210 to indicate where the mobile station currently is.

This information may be accessed later to find the mobile station when calls for the mobile station are forwarded through the home network from the PSTN. At step 412, the home MCF 204 sends an OK message (acknowledgement) to the serving MCF 204. Then, at step 414, the serving SDB 210 is updated with the identification information of the registering mobile station. Then at step 416, the serving MCF 204 registers the mobile station to the serving CA 206. This is SIP registration only—when an SIP endpoint is connected to a IP network it registers with the local SIP proxy (CA) to receive future calls. At step 418, a registration (and location update) confirmation is sent to the mobile station from the serving MCF 204 via the RAN 202. This registration information may also include an indication that the mobile station is in fact in a "roaming" area.

Figure 5:
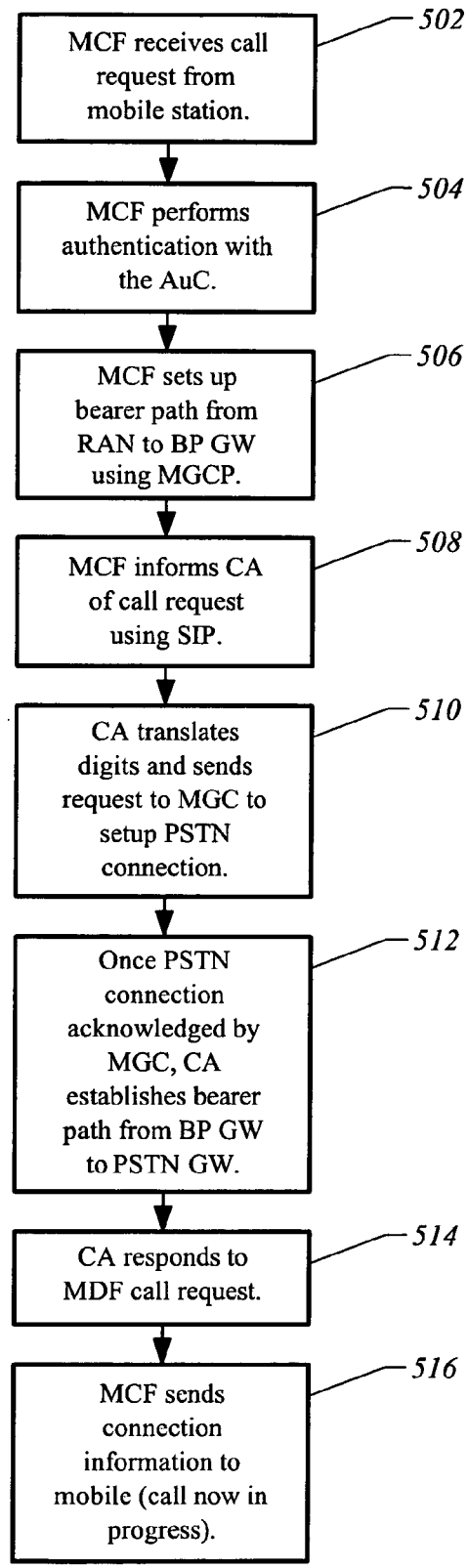
FIG. 5 is a flowchart describing steps of handling a call originated by a mobile station according to one embodiment of the present invention.

FIG. 5 is a flow chart describing steps of originating a call from a mobile station. At step 502, MCF 204 receives a call request from the mobile station via RAN 202. The call request includes a number to be dialed. At step 504, MCF 204 optionally authenticates the mobile station using AuC 208. This authentication is optional because the mobile station would likely have been authenticated at registration time. At step 506, MCF 204 assigns an endpoint address at BW GW 212 for the call bearer traffic. MCF 204 sets up the bearer path from RAN 202 to BW GW 212 using MGCP.

At step 508, MCF 204 informs serving CA 206 of the call request using SIP. Then at step 510, serving CA 206 translates the phone number information into a form appropriate for communication to MGC 214. MGC 214 establishes call signaling into the PSTN. Once the PSTN connection is acknowledged by MGC 213, CA 206 establishes a bearer path from BP GW 212 to PSTN GW 218 at step 512.

At step 514, serving CA 206 responds to the call request in a message to serving MCF 204. At step 516, a connection confirmation is sent from serving CA 206 to the mobile station via MCF 204 and RAN 202. Now that the call is completed, CA 206 has the call state "connected" for this call while serving MCF 204 would indicate connection state "registered and session active" for this mobile station.

For mobile terminated calls, i.e., when the mobile station is called by another mobile or fixed subscriber, a different process is followed. The home CA 206 for the mobile subscriber receives the call signaling information from the SS7 GW 216 via MGC 214. If the mobile station is within its home network, then the call request is relayed to MCF 204 which can then contact the mobile subscriber via RAN 202. The bearer path is established by CA 206 from PSTN GW 218 to BP GW 212 and by MCF 204 from BP GW 212 to RAN 202.

However, the mobile station may be accessible via another network—it is roaming in another network. In that case, home MCF 204 instructs the requesting CA 206 to redirect its request to the serving MCF for that mobile station. The serving MCF 204 for the mobile station can then set up the bearer path from the serving RAN 202 through the serving BW GW 212.

Hand-offs between different RANs are handled by MCF 204. The MCF handles inter-core handoffs, that is between two RANs that are connected to two different core networks and inter-RAN connected to the same core. Inter-cell hand-offs are generally handled within the RAN. In the case of a hand-off between two RANs controlled by the same MCF 204, MCF 204 will modify the connection to BW GW 212 so that it points to the new RAN 202. The IP address at the BW GW itself remains the same.

Figure 6:
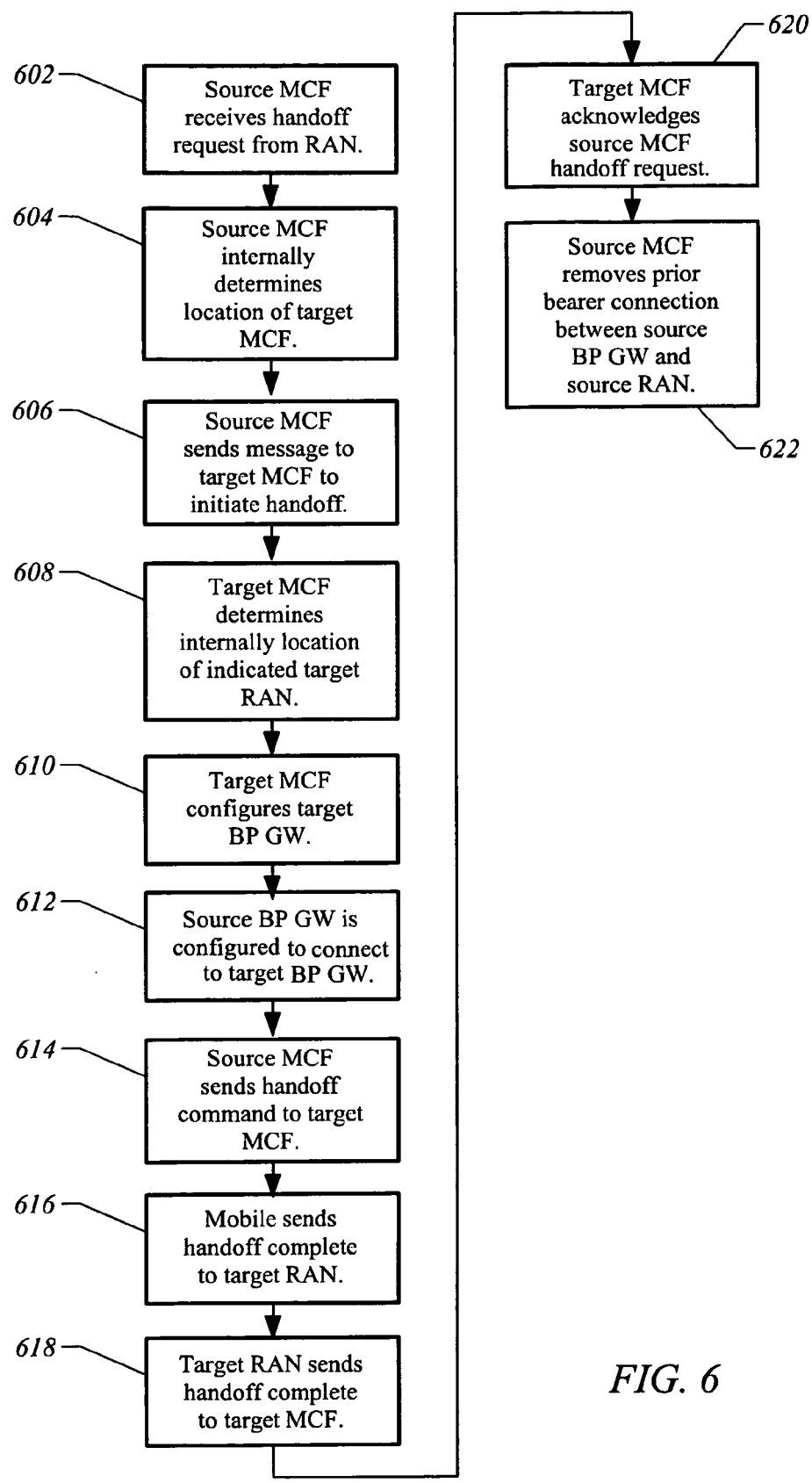
FIG. 6 is a flowchart describing steps of a handoff between networks according to one embodiment of the present invention.

FIG. 6 is a flow chart describing steps of hand-off between RANs controlled by different MCFs 204. At the beginning of the procedure of FIG. 6, the mobile station is served by the source network. There is a call in progress with the bearer path flowing between the source RAN 202 and the source BW GW 212. This call is controlled by the source CA from the source BW GW 212 to the source PSTN GW 218. After the procedure of FIG. 6, the mobile station is served at the target network. The bearer path runs from the source BW GW 212 through the target BW GW 212 and the target RAN 202 to the mobile station. Call signaling for modification and termination of the call runs through the source CA 206, the source MCF 204, the target MCF 204, and the target RAN 202.

At step 602, the source MCF 204 receives a hand-off request for the mobile station from the source RAN 202. The hand-off request includes an identifier for the base station to which hand-off is desired. At step 604, source MCF 204 determines internally (configured) the location of the target network and target MCF 204. At step 606, the source MCF 204 sends a hand-off message to the target MCF 204 to initiate handoff.

At step 608, target MCF 204 determines if the mobile has roaming permission and identifies the RAN to which the mobile station needs a handoff. Then at step 610, the target MCF 204 configures the target BW GW 212 to connect to the target RAN 202 and to the source BW GW 212 so that the bearer path for the handed off call is defined. At step 612, the source BW GW 212 is configured to connected to the target BW GW 212. Then at step 614, the source MCF 204 sends a hand-off command to the target MCF 204 for delivery to the mobile station.

At step 616, the mobile station responds by sending a hand-off complete message to the target RAN 202. Then at step 618, the target RAN 202 sends a hand-off complete message to the target MCF 204. The hand-off is then complete and the target MCF sends an OK message to the source MCF, acknowledging the handoff request at step 620. At step 622, source MCF 204 removes the prior bearer path between the source BW GW 212 and source RAN 202. The process is transparent to the CA handling the call. The target MCF 204 now controls the target RAN 202 to source BP GW 212 path and the source CA 206 continues to control the original source BP GW 212 to PSTN GW 218 path and all call related features. The target MCF 204 (through the source MCF 204) and source CA 206 control the call from this point forward.

It is understood that the examples and embodiments are described herein for illustrative purposes only and that various modifications and changes in light thereof will be suggested to persons skilled in the art and are to be included within the spirit and purview of this application and scope of the appended claims and their full scope of equivalents. For example, the present invention may also find application in wireless environments mixed between second generation and third generation wireless services and in many other types of networks and environments. All publications, patents, patent applications, IETF RFCs, etc. cited herein are hereby incorporated by reference in their entirety.

The invention claimed is:

1. In a data communication network for supporting mobile users, a method of operating a mobile control function, said method comprising:
exchanging mobile information with a mobile station via a radio access network according to a radio access network protocol;

exchanging call control information with a call agent associated with a call of said mobile station, said call agent configured to perform call control functions including call setup and connection and maintain call state information; and maintaining connection state information for said mobile station while said mobile station is handled via said radio access network;

wherein said mobile control function is performed in a separate entity from said call agent.

2. The method of claim 1 further comprising:

upon receipt of a handoff request from said radio access network, transferring responsibility for maintaining connection state information to another mobile control function.

3. The method of claim 1 wherein exchanging call control information comprises exchanging call control information via an IP network.

4. In a data communication network for supporting mobile users, a method of operating a call agent, said method comprising:

performing call control operations comprising call setup and connection;

exchanging call control information with a first mobile control function responsible for mobility management of a mobile station having a call handled by said call agent; and maintaining call state information for said mobile station;

wherein said mobile control function is a separate entity from said call agent.

5. The method of claim 4 further comprising:

upon a shift of responsibility for mobility management of said mobile station from said first mobile control function to a second mobile control function, exchanging call control information with said second mobile control function;

continuing to maintain call state information for said mobile station while said second mobile control function maintains connection state information for said mobile station.

6. The method of claim 4 wherein said call control information comprises an indication of an inbound call for said mobile station.

7. The method of claim 4 wherein said call control information comprises an indication of a dialed call from said mobile station.

8. The method of claim 4 wherein exchanging call control information comprises exchanging call control information via an IP network.

9. For use in a data communication network for supporting mobile users, a computer program product for operating a mobile control function, said product comprising:

code that causes a processor to exchange mobile information with a mobile station via a radio access network according to a radio access network protocol;

code that causes said processor to exchange call control information with a call agent associated with a call of said mobile station, said call agent configured to perform call control functions including call setup and connection and maintain call state information;

code that causes said processor to maintain connection state information for said mobile station while said mobile station is handled via said radio access network; and a computer-readable storage medium for storing the codes;

wherein said mobile control function is performed in a separate entity from said call agent.

10. The computer program product of claim 9 further comprising:

code that, upon receipt of a handoff request from said radio access network, code that causes said processor to transfer responsibility for maintaining connection state information to another mobile control function.

11. The computer program product of claim 9 wherein said code that causes said processor to exchange call control information comprises code that exchanges call control information via an IP network.

12. For use in a data communication network for supporting mobile users, a computer program product for operating a call agent, said product comprising:

code that causes a processor to perform call control operations comprising call setup and connection;

code that causes said a processor to exchange call control information with a first mobile control function responsible for mobility management of a mobile station having a call handled by said call agent;

code that causes said processor to maintain call state information for said mobile station; and a computer-readable storage medium that stores the codes;

wherein said mobile control function is a separate entity from said call agent.

13. The product of claim 12 further comprising:

code that upon a shift of responsibility for mobility management of said mobile station from said first mobile control function to a second mobile control function, causes said processor to exchange call control information with said second mobile control function; and code that causes said processor to continue to maintain call state information for said mobile station while said second mobile control function maintains connection state information for said mobile station.

14. The product of claim 12 wherein said call control information comprises an indication of an inbound call for said mobile station.

15. The product of claim 12 wherein said call control information comprises an indication of a dialed call from said mobile station.

16. The product of claim 12 wherein said code that causes said processor to exchange call control information comprises code that causes said processor to exchange call control information via an IP network.

17. For use in a data communication network for supporting mobile users, an apparatus for operating a mobile control function, said method comprising:

a processor that executes software; and a computer-readable storage medium that stores said software, said software comprising:

code that causes said processor to exchange mobile information with a mobile station via a radio access network according to a radio access network protocol;

code that causes said processor to exchange call control information with a call agent associated with a call of said mobile station, said call agent configured to perform call control functions including call setup and connection and maintain call state information; and code that causes said processor to maintain connection state information for said mobile station while said mobile station is handled via said radio access network;

wherein said mobile control function is performed in a separate entity from said call agent.

18. The apparatus of claim 17 wherein said software further comprises:
code that, upon receipt of a handoff request from said radio access network, that causes said processor to transfer responsibility for maintaining connection state information to another mobile control function.

19. The apparatus of claim 17 wherein said code that exchanges call control information comprises code that exchanges call control information via an IP network.

20. For use in a data communication network for supporting mobile users, apparatus for operating a call agent, said apparatus comprising:
a processor that executes software;
a computer-readable storage medium that stores said software, said software comprising:
code that causes said processor to perform call control operations comprising call setup and connection;
code that causes said processor to exchange call control information with a first mobile control function responsible for mobility management of a mobile station having a call handled by said call agent; and
code that causes said processor to maintain call state information for said mobile station;
wherein said mobile control function is a separate entity from said call agent.

21. The apparatus of claim 20 wherein said software further comprises:
code that upon a shift of responsibility for mobility management of said mobile station from said first mobile control function to a second mobile control function, causes said processor to exchange call control information with said second mobile control function; and
code that causes said processor to continue to maintain call state information for said mobile station while said second mobile control function maintains connection state information for said mobile station.

22. The apparatus of claim 20 wherein said call control information comprises an indication of an inbound call for said mobile station.

23. The apparatus of claim 20 wherein said call control information comprises an indication of a dialed call from said mobile station.

24. The apparatus of claim 20 wherein said code that exchanges call control information comprises code that exchanges call control information via an IP network.

25. In a data communication network for supporting mobile users, apparatus for operating a mobile control function, said apparatus comprising:
means for exchanging mobile information with a mobile station via a radio access network according to a radio access network protocol;
means for exchanging call control information with a call agent associated with a call of said mobile station, said call agent configured to perform call control functions including call setup and connection and maintain call state information; and
means for maintaining connection state information for said mobile station while said mobile station is handled via said radio access network;
wherein said mobile control function is performed in a separate entity from said call agent.

26. The apparatus of claim 25 further comprising:
means for, upon receipt of a handoff request from said radio access network, transferring responsibility for maintaining connection state information to another mobile control function.

27. The apparatus of claim 25 wherein said means for exchanging call control information comprises means for exchanging call control information via an IP network.

28. In a data communication network for supporting mobile users, apparatus for operating a call agent, said apparatus comprising:
means for performing call control operations comprising call setup and connection for both mobile and non mobile calls;
means for exchanging call control information with a first mobile control function responsible for mobility management of a mobile station having a call handled by said call agent; and
means for maintaining call state information for said mobile station;
wherein said mobile control function is a separate entity from said call agent.

29. The apparatus of claim 28 further comprising:
means for, upon a shift of responsibility for mobility management of said mobile station from said first mobile control function to a second mobile control function, exchanging call control information with said second mobile control function; and
means for continuing to maintain call state information for said mobile station while said second mobile control function maintains connection state information for said mobile station.

30. The apparatus of claim 28 wherein said call control information comprises an indication of an inbound call for said mobile station.

31. The apparatus of claim 28 wherein said call control information comprises an indication of a dialed call from said mobile station.

32. The apparatus of claim 28 wherein said means for exchanging call control information comprises means for exchanging call control information via an IP network.

33. A data communication network, comprising:
a mobile control function, which is responsible for mobility management of a mobile station, that exchanges information via a radio access network according to a radio access network protocol and maintains connection state information for said mobile station while said mobile station is handled via said radio access network; and
a call agent capable of performing call control operations comprising call setup and connection, which is associated with a call of said mobile station, that exchanges call control information with said mobile control function and maintaining call state information for said mobile station;
wherein said mobile control function and call agent are separate entities.

34. The network of claim 33 wherein upon receipt of a handoff request from said radio access network, said mobile control function transfers responsibility for maintaining connection state information to another mobile control function.

35. The network of claim 33, wherein said connection state information is mobile registered or session active.

36. The network of claim 33, wherein said call state information is connected, call in progress, releasing, suspend, or busy.

37. The network of claim 33 wherein the mobile control function and the call agent are configured to communicate utilizing an IP control protocol.

38. The network of claim 37 wherein the IP control protocol is a session initiation protocol (SIP).

39. The network of claim 33 wherein the call agent is configured to perform call control operations for mobile and non-mobile calls.

40. The method of claim 1 wherein communication between said mobile control function and said call agent is via an IP control protocol.

* * * * *